March 10, 1964

J. S. KURTZ ETAL 3,124,102

NEST SUPPORT

Filed July 9, 1962

INVENTOR.
JOHN S. KURTZ
JEWEL GRAVES
BY
ATTORNEYS

United States Patent Office 3,124,102
Patented Mar. 10, 1964

3,124,102
NEST SUPPORT
John S. Kurtz, Ephrata, Pa., and Jewel Graves, Holland, Mich., assignors to Automatic Poultry Feeder Company, Zeeland, Mich., a corporation of Michigan
Filed July 9, 1962, Ser. No. 208,297
6 Claims. (Cl. 119—48)

This invention relates to nest structures, and more particularly to a combination nest structure and egg conveyor mechanism and to a unique support means for a combination egg conveyor and nest housing.

Automated poultry raising techniques necessitate egg conveying apparatus adjacent the poultry nest housing. The egg conveyor must be accurately positioned, vertically, with respect to the poultry nests to achieve a dependable egg roll-out arrangement without egg breakage. Normally therefore, the conveyor mechanism is mounted directly to the nest housing to assure this vertical alignment. This type of structure prevents rearrangement of the housing with respect to the conveyor longitudinally. Moreover, one such conveyor normally can accommodate only one nest housing rather than a pair of back-to-back housings. If a back-to-back arrangement is achieved with conventional apparatus, the structure must be rigidly interconnected to be stable and to assure proper alignment. The structure is thus inflexible. Back-to-back nest housings cannot be longitudinally adjusted with respect to each other. Neither does this type of structure enable rapid assembly and disassembly of the complete apparatus. In other words, conventional combination nest housings and conveyor mechanisms are not versatile or flexible to adapt to varying situations, nor can they be readily assembled and disassembled.

Another disadvantage of conventional nest housings is the inability to be vertically adjusted to accommodate uneven or stepped poultry house floors. Attempted adjustment of conventional housings merely causes disruption of the entire assembled structure, especially with respect to the conveyor mechanism.

Egg conveyor belts have a still further disadvantage in that the return belt should be accurately guided in its path, but if so tends to become discolored by rubbing on the metal return track. This discoloration of the belt discolors the eggs, thereby creating an egg cleaning problem.

It is an object of this invention to provide a combination nest housing and egg conveyor mechanism wherein the conveyor is always maintained at a constant vertical height with respect to the housing, to achieve optimum egg transfer conditions, and yet where a pair of housings may be longitudinally varied with respect to each other and with respect to the conveyor. Thus, oppositely positioned nest housings may be moved from a first position where the egg roll-out openings are opposite each other to a second position where egg roll-out openings are staggered.

It is another object of this invention to provide a combination nest housing and conveyor support capable of supporting the nest housings in a cooperative adjacent manner, enabling easy, simple assembly and disassembly of the nest housings and of the conveyor mechanism which cooperates with the nest housings and yet is not connected thereto.

It is another object of this invention to provide a highly versatile and flexible nest housing and conveyor structure readily adaptable to uneven poultry house floors, or stepped floors and the like.

It is a still further object of this invention to provide a unique support stand for independent support of the egg conveyor and the nest housing, enabling simple assembly, and including a built-in conveyor belt return capable of guiding the returning belt in a protected manner and of preventing the belt from becoming discolored or snagged.

These and other objects of this invention will be apparent upon studying the following specification in conjunction with the drawings in which.

Basically, the inventive apparatus comprises a combination nest housing and egg conveyor including a plurality of novel support stands supporting both the housing and the conveyor in adjacent cooperative relationship, but not attached to each other. Each support stand includes a platform having vertically adjustable standards. The nest housings are longitudinally slidably supported on the stands to enable back-to-back housings to be adjusted with respect to each other and with respect to the conveyor. Interfitting with the platform is an inverted generally U-shaped element having a conveyor belt track on its upper surface and forming a built-in confined belt return between its legs. The belt return includes a lubricous plastic clip to provide lubrication for the belt and to prevent discoloration of the return belt.

Figure 1:
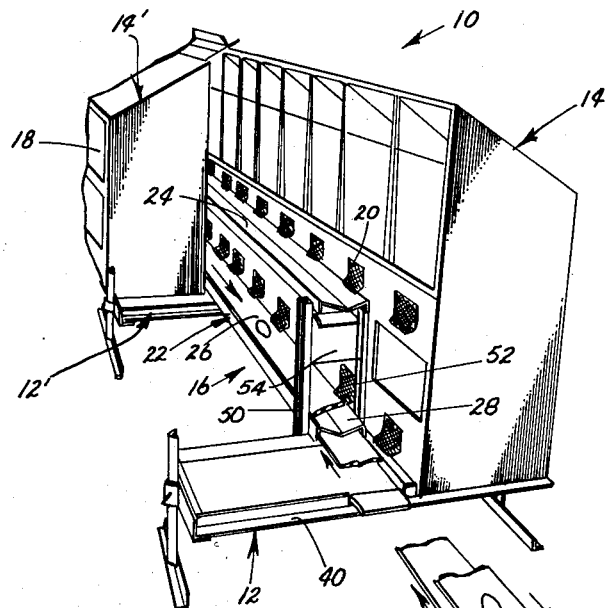
FIG. 1 is a perspective view of a novel combination nest housing and conveyor mechanism showing two nest housings back to back adjacent the conveyor and all mounted on a plurality of the support stands.
Figure 2:
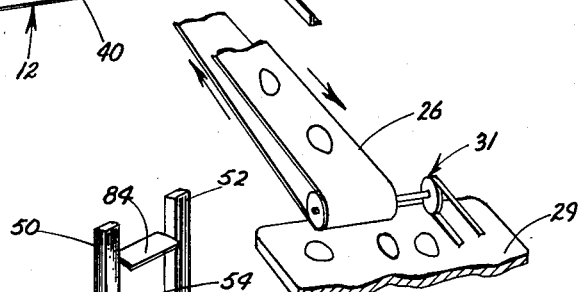
FIG. 2 is a perspective enlarged view of one of the novel support stands.
Figure 2:
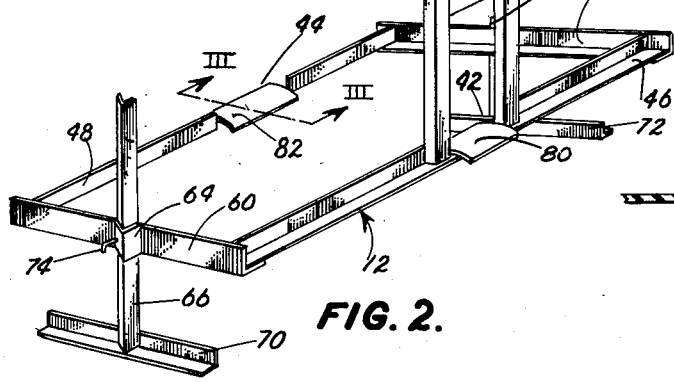

Referring to the drawings, the novel combination 10 includes a plurality of support stands 12 upon which a conveyor means 16 and a pair of back-to-back nest housings 14 and 14' are mounted. In the form illustrated in FIG. 1, nest housing 14' is shown longitudinally displaced a substantial amount from the support stand 12 to both enable visualization of the conveyor mechanism 16 between the housings, and to show the capacity of the apparatus for longitudinal adjustment. Within each of the nest housings is a plurality of individual nests, each having a poultry inlet 18, preferably in the front face, and an egg roll-out opening 20 in the rear face. Suitable nest inserts like those disclosed in co-pending application entitled Roll-A-Way Nest, Serial No. 78,625, filed December 27, 1960, now Patent No. 3,046,940, may be utilized.

In the illustrated form of the invention, the conveyor means 16 includes two levels 22 and 24. The lower level 22 has a first belt 26 traveling to the right (as shown) over the top surface of the generally U-shaped, inverted conveyor track 28 and returning between its legs. The upper U-shaped track 24 is shown without its separate belt. Each belt 26 is driven by any suitable drive means 31 represented schematically in FIG. 1. The belt is supported by and rides on the upper track surface of the U-shaped elements, with said surface being slightly concave to facilitate optimum egg transfer. That form of drive illustrated in my copending application entitled Egg Collection and Transveyor System, Serial No. 208,302, filed July 9, 1962 may be utilized if desired. The conveyor mechanism 16 may also be associated with the type of elevator and table mechanism shown in the above, latter mentioned application. Also, the belt 26 of jute or the like may include a container for the slack belt and tightening means to accommodate the belt to different moisture conditions of the atmosphere. Any suitable egg gathering means such as table 29 may be utilized to cooperate with the conveyor as the circumstances require.

The lower U-shaped element 28 rests on the platforms 40 of the support stands 12, and is retained in cut-out portions 42 and 44 of the angle iron members 46 and 48 forming two sides of the platform. The upper U-shaped element is confined between vertical legs 50 and 52 which are affixed at their lower ends to one of the elements 46 or 48 as by weldment. The upper ends include a suitable spacing and connecting panel 54. The U-shaped elements may thus be slidably inserted and removed in a quickly assembled manner.

Elements 46 and 48 are connected as by weldment to end elements 60 and 62 also preferably formed of angle iron to complete platform 12.

Mounted onto elements 60, 62 is a pair of sockets 64 each of which receives a respective leg 66 or 68 of a pair of vertical standards. The standards include feet 70 and 72. Threaded twist lock elements 74 enable vertical adjustment of the platform 12 on the upright standards. Since a plurality of these supports are used, one end of the nest housings and the conveyor may be readily vertically adjusted with respect to other portions to accommodate any particular floor irregularity. Further, the nest housings 14 and 14' may be longitudinally slid upon the plurality of supports 12 to place the housings in a desired relationship with respect to each other and with respect to the conveyor. It will be noted that vertical alignment of the conveyor flights with the egg roll-out openings 20 will always be maintained to assure optimum egg roll-out characteristics.

Figure 3:
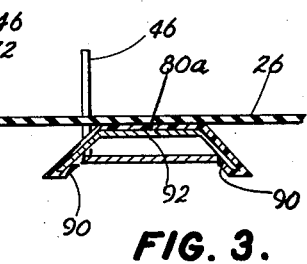
FIG. 3 is a detailed drawing of one type of belt support mounted on the support stand.

The support stands also includes a built-in belt return mechanism. Each belt is confined between the legs of the respective U-shaped inverted element 28. The belt is supported as it passes between these legs, by lubricious plastic clips 80 and 82 for the lower belt 26, and 84 for the upper belt (not shown). As illustrated by FIG. 3, each belt support structure may include a plastic clip, designated by reference numeral 80a, having a flat upper area, diagonally downwardly extending edges, and snap-on edge flanges 90 which clip around the metallic supports 92 affixed to the angle shaped elements 46 and 48. The plastic clips may be formed of any suitable plastic such as nylon, Teflon, or the like. Thus, the underside of the return belt, i.e. the upper side of the egg conveying portion of the belt, does not come into rubbing contact with metallic surfaces, but only with the lubricious plastic clips. This prevents discoloration of the belt due to rubbing of metal and thereby prevents discoloration of eggs conveyed on the belt. It also forestalls snagging of the jute belt on metallic portions and assures positive guide of the belt in a confined manner. It also provides long belt life.

In operation, as eggs roll out the openings 20 from the individual nests, they roll onto the conveyor belts 26 which carry the eggs over the support surfaces of the U-shaped elements to a collection table 29. The belt return between the legs of the respective inverted U-shaped elements 28, passing over the lubricious plastic clips 80 and 82 for the lower belt, and 84 for the upper belt. The belts move to the opposite end of the nest housings and around return idler rollers (not shown), to thus again pass by the egg roll-out openings 20 of the nests. This provides a constant collection means for eggs as they are laid.

When installed, the unit is quickly assembled by attaching and adjusting the standards to the platform 12, slidably inserting the generally U-shaped elements in the notches 42 and 44 and between the legs 50 and 52 to form the two flights of the conveyor, placing a pair of jute belts or the equivalent on the support elements and around the driving and idler rollers, placing the nest housings 14 and 14' in back-to-back relationship and in the desired longitudinal spaced relationship on the platforms, and then actuating the driving means 28 to continuously operate the conveyor belt 26. The resulting unit is thus readily assembled, highly flexible and adaptable to a variety of conditions.

Other advantages than those specifically enumerated will probably be apparent to those in the art upon studying the foregoing specification and the illustrated forms of the invention. Also, various obvious modifications may occur to those in the art in the alteration of specific mechanical features within the principles of the invention as taught. These obvious modifications are believed to be part of this invention which is to be limited only by the scope of the appended claims and the reasonable equivalents to those structures defined therein, rather than to the illustrated form of the invention.

We claim:

1. A nest structure comprising: at least two supporting stands arranged in spaced relationship, each stand having nest support portions separated by upstanding conveyor support means; a pair of nest housings supported on said nest support portions and spanning the distance between said stands; each of said housings having at least one tier of nest enclosures each having an egg roll-out opening adjacent to and facing said conveyor support means; and conveyor means on said conveyor support means, said conveyor means running intermediate said nest housings between said upstanding conveyor support means and at substantially the same vertical level as said openings for receiving and conveying eggs passing through said openings from said nest enclosures.

2. A nest structure comprising: at least two supporting stands arranged in spaced relationship, each stand having vertically adjustable legs and nest support portions separated by upstanding conveyor support means; a pair of nest housings supported on said nest support portions and spanning the distance between said stands; each of said housings having at least one tier of nest enclosures each having an egg roll-out opening adjacent to and facing said conveyor support means; and conveyor means on said conveyor support means, said conveyor means running intermediate said nest housings between said upstanding conveyor support means and at substantially the same vertical level as said openings for receiving and conveying eggs passing through said openings from said nest enclosures.

3. A nest structure comprising: at least two supporting stands arranged in spaced relationship, each stand having nest support portions separated by upstanding conveyor support means; said conveyor support means including two spaced upright supports having conveyor belt support means extending horizontally therebetween; a pair of nest housings supported on said nest support portions and spanning the distance between said stands; each of said housings having at least one tier of nest enclosures each having an egg roll-out opening adjacent to and facing said conveyor support means; and a belt conveyor on said belt support means, said belt conveyor running intermediate said nest housings between said upstanding conveyor support means and at substantially the same vertical level as said openings for receiving and conveying eggs passing through said openings from said nest enclosures.

4. The nest structure of claim 1 in which there are at least two tiers of nest enclosures and said conveyor support means has a corresponding number of conveyor supports spaced vertically one from the other, one for each tier.

5. The nest structure of claim 2 in which there are at least two tiers of nest enclosures and said conveyor support means has a corresponding number of conveyor supports spaced vertically one from the other, one for each tier.

6. The nest structure of claim 3 in which there are at least two tiers of nest enclosures and said conveyor support means has a corresponding number of conveyor supports spaced vertically one from the other, one for each tier.

References Cited in the file of this patent

UNITED STATES PATENTS

| | | |
|---|---|---|
| 1,770,099 | Humy et al. | July 8, 1930 |
| 1,850,891 | Nyborg | Mar. 22, 1932 |
| 2,544,496 | Gass | Mar. 6, 1951 |
| 2,676,566 | Krieger | Apr. 27, 1954 |
| 2,714,950 | Rubin | Aug. 9, 1955 |
| 2,745,379 | Schmidt | May 15, 1956 |
| 2,886,173 | Scott | May 12, 1959 |
| 2,973,742 | Kaegebein | Mar. 7, 1961 |